United States Patent
Schlipf et al.

(10) Patent No.: US 12,486,018 B2
(45) Date of Patent: Dec. 2, 2025

(54) SEALING STRIP, CONTROL SURFACE ARRANGEMENT, AIRCRAFT WING AND AIRCRAFT

(71) Applicant: Airbus Operations GmbH, Hamburg (DE)

(72) Inventors: Bernhard Schlipf, Hamburg (DE); Martin Fees, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 0 days.

(21) Appl. No.: 18/602,477

(22) Filed: Mar. 12, 2024

(65) Prior Publication Data

US 2024/0326981 A1    Oct. 3, 2024

(30) Foreign Application Priority Data

Mar. 27, 2023    (EP) ..................................... 23164259

(51) Int. Cl.
*B64C 9/02*    (2006.01)

(52) U.S. Cl.
CPC ...................... *B64C 9/02* (2013.01)

(58) Field of Classification Search
CPC ............................ B64C 9/02; B64C 2009/143
See application file for complete search history.

(56) References Cited

U.S. PATENT DOCUMENTS 2,794,221 A * 6/1957 Bedics .................... B29C 65/02
                                                          156/92
11,209,084 B2 * 12/2021 Dovey ..................... B22F 5/106
(Continued)

FOREIGN PATENT DOCUMENTS

DE    102012006187 A1    10/2013
EP          0071669 A1     2/1983
(Continued)

OTHER PUBLICATIONS

"Mechanics of Materials 1 (third Edition), Chapter 1—Simple Stress and Strain", E.J. Hearn, Publication Date 1997, retrieved on May 22, 2025 from https://www.sciencedirect.com/science/article/pii/B9780750632652500025?ref=pdf_download&fr=RR-2&rr=943e0d5ede2d431b (Year: 1997).*
(Continued)

*Primary Examiner* — Joshua D Huson
*Assistant Examiner* — Shanna Danielle Glover
(74) *Attorney, Agent, or Firm* — Greer, Burns & Crain, Ltd.

(57) ABSTRACT

A sealing strip for sealing a gap between convexly curved aerodynamic surface elements of an aircraft. The sealing strip has a convexly curved outer side, welting sections at both longitudinal edges of the sealing strip for fixing the sealing strip at the aerodynamic surface elements, and a mid-seal section between the welting sections. The welting sections protrude on an inner side from the mid-seal section. The sealing strip has a first, second, and third length regions, the second length region being located longitudinally between the first and third length region. The welting sections are omitted in the second length region or the welting sections in the second length region are less rigid than the welting sections in the first and third length regions. Further, a control surface arrangement, a wing and an aircraft with such a sealing strip.

9 Claims, 6 Drawing Sheets

(56) References Cited

U.S. PATENT DOCUMENTS

| | | | |
|---|---|---|---|
| 2012/0187254 A1* | 7/2012 | Wollaston | B64C 9/22 |
| | | | 244/214 |
| 2013/0256461 A1 | 10/2013 | Maenz | |
| 2017/0274977 A1 | 9/2017 | Zhang et al. | |

FOREIGN PATENT DOCUMENTS

| | | | | |
|---|---|---|---|---|
| EP | 3222515 A1 | 9/2017 | | |
| FR | 2479306 A1 | 10/1981 | | |
| WO | WO-2004088082 A1 * | 10/2004 | | E06B 7/2312 |

OTHER PUBLICATIONS

"Stress Concentration at Holes", Bob McGinty, Published by Fracture Mechanics.org, Publication Date Oct. 2014, retrieved on May 22, 2025 from https://www.fracturemechanics.org/hole.html (Year: 2014).*

European Search Report for corresponding European Patent Application No. 23164259.6 dated Sep. 12, 2023.

\* cited by examiner

SEALING STRIP, CONTROL SURFACE ARRANGEMENT, AIRCRAFT WING AND AIRCRAFT

CROSS-REFERENCES TO RELATED APPLICATIONS

This application claims the benefit of European Patent Application Number 23 164 259.6 filed on Mar. 27, 2023, the entire disclosure of which is incorporated herein by way of reference.

FIELD OF THE INVENTION

The invention relates to a sealing strip for sealing a gap between convexly curved aerodynamic surface elements of an aircraft. Further, the invention relates to a control surface arrangement with adjacent control surface elements and a gap therebetween covered by such sealing strip. Further, the invention relates to an aircraft wing having such control surface arrangement. Finally, the invention relates to an aircraft with such control surface arrangement and/or such a wing.

BACKGROUND OF THE INVENTION

Between slats or other control surface elements of an aircraft, a gap is required which is covered by a so-called weather seal. The weather seal is a sealing strip which is curved, in use, according to the curvature of the control surface elements.

SUMMARY OF THE INVENTION

An object of the invention is to improve a sealing of a gap between control surfaces of an aircraft in order to enhance aerodynamics.

For achieving such object, the invention provides a sealing strip according to one or more embodiments described herein. According to further aspects, the invention provides a control surface arrangement, an aircraft wing and an aircraft having a gap sealed by such sealing strip.

The invention provides a sealing strip for sealing a gap between convexly curved aerodynamic surface elements of an aircraft such that the sealing strip has a convexly curved outer side, the sealing strip having welting sections at both longitudinal edges of the sealing strip for fixing the sealing strip at the aerodynamic surface elements and a mid-seal section between the welting sections, wherein the welting sections protrude on an inner side from the mid-seal section, wherein the sealing strip has a first length region, a second length region and a third length region, the second length region being located longitudinally of the sealing strip between the first and third length regions, wherein the second length region has no welting sections or has welting sections that are less rigid than the welting sections of the first and third length regions.

Preferably, the welting sections of the second length region have a reduced stiffness due to a different contour different to the contour of the welting sections of first and third length region. Additionally or alternatively, the welting sections of the second length section are not continuous and/or do not have a continuous cross-section. Preferably, the first and/or third length region have a profile, i.e., a continuous cross-section so that the cross-section of their welting sections is continuous.

Preferably, the welting sections of the second length region have a thickness or diameter which is smaller than the thickness or diameter, respectively, of the welting sections of the first and third length region.

Preferably, the welting sections of the second length region has cut-outs, especially a series of cut-outs. Preferably, lengths of welting sections with the same cross-section as in the first and/or third length region alternate with cut-outs. Especially, the cut-outs are such that the thickness or diameter of the welting section is reduced here, or that the welting section is removed here.

Preferably, the second length region has welting sections with castellations, i.e., a set of grooves or slots. For example, while the welting sections are continuous in the first and second length regions, the welting sections in the second length region are provided by a series of teeth with grooves or omissions therebetween.

Preferably, the welting sections of the second length region have a series of cut-outs and/or grooves or slots of same length. According to another embodiment, the stiffness of the welting section in the second length region is chosen in dependence from the curvature of the sealing strip in use. For example, the sealing strip may have a series of cut-outs or slots or grooves in welting sections in the second length region. The number and/or length of the cut-outs, grooves or slots is dependent from their location in the longitudinal direction. For example, there are more or longer cut-outs or slots or grooves on locations in the longitudinal direction where the sealing strip is curved with smaller radii in use, for example in a nose area with a strong bending.

Preferably, the sealing strip has, in the first and third length regions, a profile with the welting sections and the mid-seal section therebetween and with at least one stringer-type stiffening structure arranged on the inner side of the mid-seal section.

Preferably, the stringer-type stiffening structure is omitted in the second length area or has a stiffness reduced compared to the stiffness of the stringer-type stiffening structure of the first and third length regions.

Preferably, the stiffening structure comprises a flange portion protruding on the inner side of the mid-seal section.

Preferably, the stiffening structure consists only of the flange. Preferably, the flange has a rectangular or trapezoid or triangular section.

Preferably, the stiffening structure comprises a neck portion and a head portion.

Preferably, the head portion comprises at least one longitudinal inner reinforcement and/or reinforcement fibers.

Preferably, the stiffening structure is configured to align the local neutral fiber location of the mid-seal section of the bent sealing strip with the local neutral fiber location of the welting sections.

Preferably, one stiffening structure is provided in the centrum of the sealing strip. Preferably, several stiffening structures are evenly distributed over the width of the mid-seal section. Preferably, even spaces are provided between adjacent stiffening structures. Preferably, even spaces are provided between the at least one stiffening structure and the welting sections.

According to another aspect, the invention provides a control surface arrangement for an aircraft, comprising a first and second control surface element having convexly curved outer surfaces and being arranged side by side in a spanwise direction with a gap therebetween, wherein the gap is covered by a sealing strip according to any of the preceding claims.

Preferably, one of the welting sections is fixed to the first control surface element, the other welting section is fixed to the second control surface element, the outer side of the mid-seal section is convexly curved and exposed to the outside.

In a preferred embodiment of the control surface arrangement the second length region is arranged in an area of the control surface arrangement with the strongest curvature (i.e., the smallest curvature radius). Especially the second length region is that length region of the sealing strip which is arranged in a nose area of the control surface arrangement (e.g., at the leading edge of an aircraft wing or similar).

Preferably, the number or the size of the local cut-outs or castellations is a function of the local curvature radius.

Preferably, the control surface elements are movable between a fully extended position and a fully retracted position.

Preferably, the control surface elements are leading edge slats for an aircraft wing.

According to another aspect, the invention provides an aircraft wing, comprising a control surface arrangement according to any of the aforementioned embodiments.

According to another aspect, the invention provides an aircraft, comprising a control surface arrangement or an aircraft wing according to any of the aforementioned embodiments.

According to another aspect, the invention proposes an use of a sealing strip according to any of the aforementioned embodiments as a weather seal for sealing a gap between convexly curved aerodynamic surface elements of an aircraft such that the sealing strip has an outer side being convexly curved in use, wherein the presence or stiffness or geometry or distribution of the welting sections is chosen such that the local neutral fiber of the mid-seal section of the bent sealing strip is shifted from the mid-plane of the mid-seal section to the inside.

Preferred embodiments of the invention lie in the technical field of transport aircrafts.

Preferred embodiments of the invention lie in the technical field of seals for wing-movables.

Preferred embodiments of the invention lie in the technical field of seals of high-lift movables, especially slat-seals.

Preferred embodiments of the invention relate to a slotted weather seal.

Preferred embodiments of the invention relate to a weather seal with locally reduced welting sections.

A weather seal is provided with welting sections reduced in a middle length region in order to enhance its bending behavior so that it can fit better to the form of curved aerodynamic surfaces having a gap therebetween which shall be covered by the weather seal.

According to preferred embodiments of the invention a seal is provided that can be bent such that it fits more closely to curved aerodynamics surfaces such that a step between the aerodynamic surface and the seal is reduced compared to conventional weather seals. Hence, preferred embodiments of the invention have the advantage to improve aerodynamics by reduction of parasitic drags and attachment line discontinuities.

BRIEF DESCRIPTION OF THE DRAWINGS

Embodiments of the invention are explained below referring to the accompanying drawings in which.

DETAILED DESCRIPTION OF THE PREFERRED EMBODIMENTS

Figure 1:
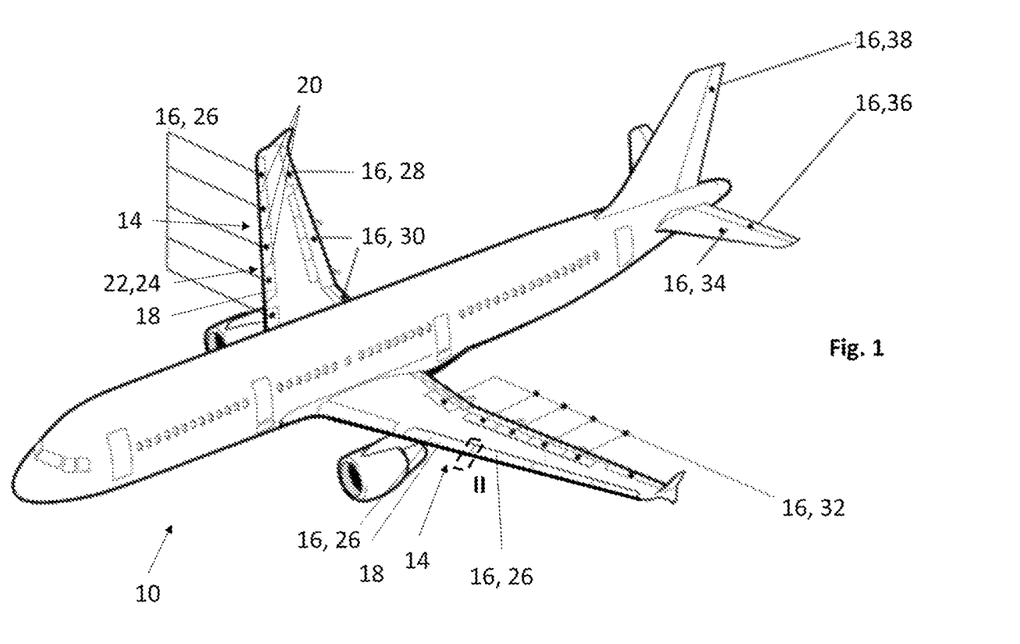
FIG. 1 shows a perspective view of an aircraft with wings and control surface arrangements on the leading edge of the wings.
Figure 8:
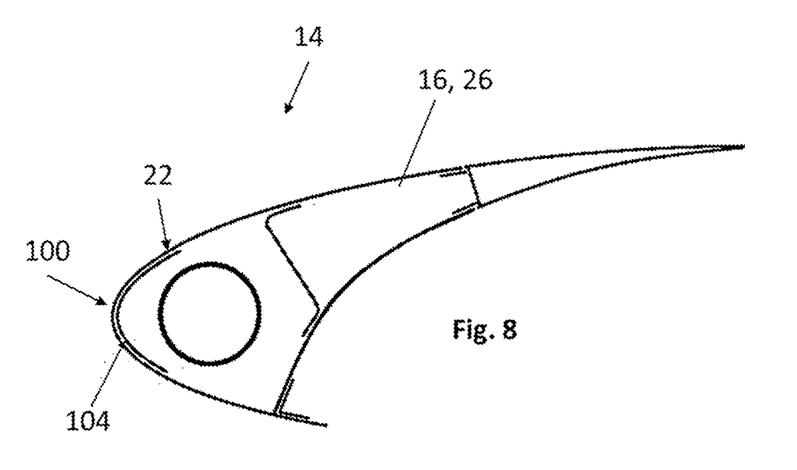
FIG. 8 shows a sectional chordwise view through the control surface arrangement wherein a location of a length region with reduced welting sections is indicated.

FIG. 1 shows an aircraft 10 having aircraft wings 12 and control surface arrangements 14. A detail II of one of the control surface arrangements 14 is shown in a spanwise and sectional view in FIG. 2 while a chordwise sectional view thereof is shown in FIG. 8. The control surface arrangement 14 comprises first and second control surface elements 16 having convexly curved outer surfaces 18 and being arranged side by side in a spanwise direction. A gap 20 between the control surface elements 16 is covered by a sealing strip 22 for providing a weather seal 24.

Referring again to FIG. 1, the aircraft 10 has several control surface elements 16 on different locations. Examples for the control surface elements 16 are slats 26 on the leading edges of the wings 12, ailerons 28 and flaps 30, spoilers 32, trimmable horizontal stabilizers 34, elevators 36, and a rudder 38. Some of the control surface elements 16, especially the leading-edge slats 26, have the convexly curved outer surface 18.

Figure 2:
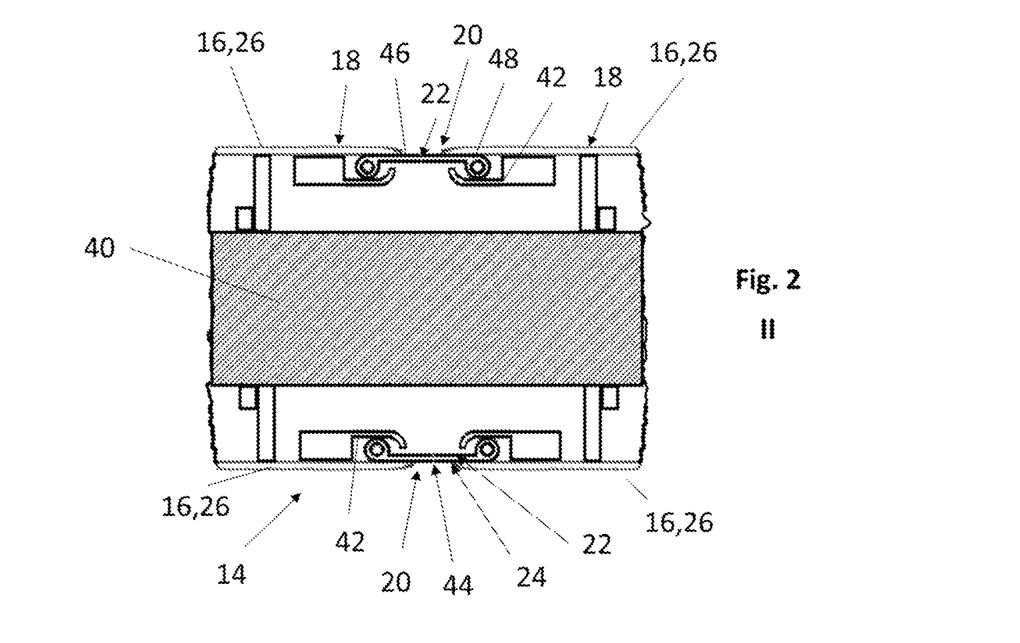
FIG. 2 shows a spanwise and vertical sectional view through a part of the control surface arrangement which is located at the detail II of FIG. 1, with a sealing strip according to a comparative example.

FIG. 2 shows a spanwise sectional view according to the detail II of FIG. 1 wherein a first and second slat 26 are arranged close to each other with the gap 20 therebetween and wherein a sealing strip 22 according to a comparative example is installed to cover the gap 20. Especially, FIG. 2 shows a slat installation as an example for the control surface arrangement 14 with the weather seal 24.

The slats 26 are movably mounted on a wing structure 40 so that they can move between a fully extended position and a fully retracted position. The weather seal 24 is to be fitted with the slats 26.

For mounting the weather seal 24, the slats 26 are equipped with seal brackets 42 on their inner sides. Other seal mounting structures such as grooves formed integrally in the side regions of the slats 26 are possible.

The seal 24 is to be fitted in the extended slat position and moves together with the slats 26. In accordance with the curvature of the outer surfaces 18 of the slats 26, the sealing strip 22 constituting the weather seal 24 is bent such that its outer side 44 to be exposed to the outside is convexly bent. Referring to FIG. 8, the strongest curvature (with the smallest bending radius) exists in a nose area 100.

Figure 3:
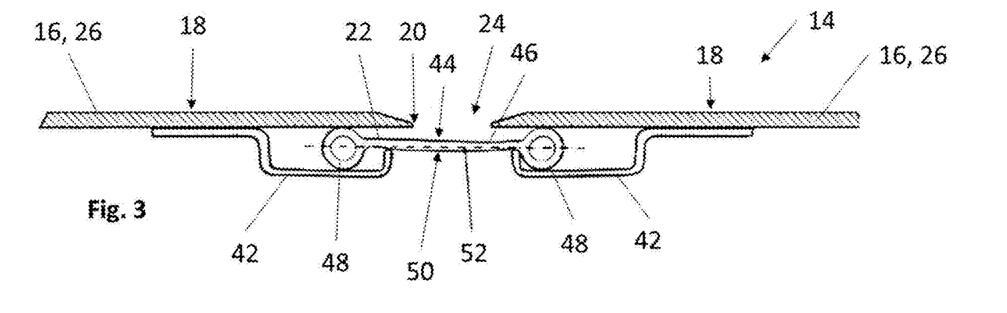
FIG. 3 shows an enlarged view of the sealing strip of FIG. 2 wherein a possible bending tendency thereof is indicated.
Figure 4:
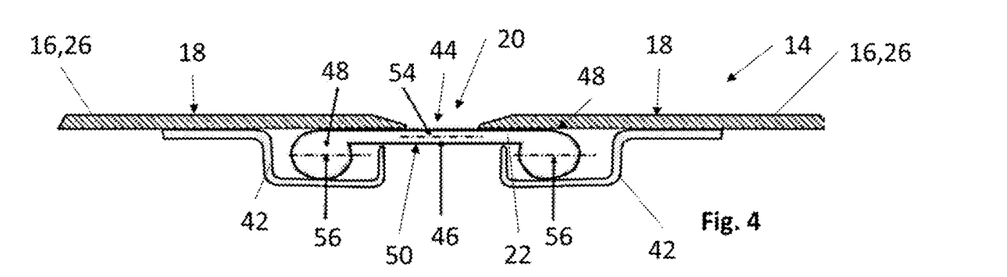
FIG. 4 shows a further sectional view of the control surface arrangement with the sealing strip according to the comparative example, wherein local neutral fiber of different sections of the sealing strip are indicated.
Figure 5:
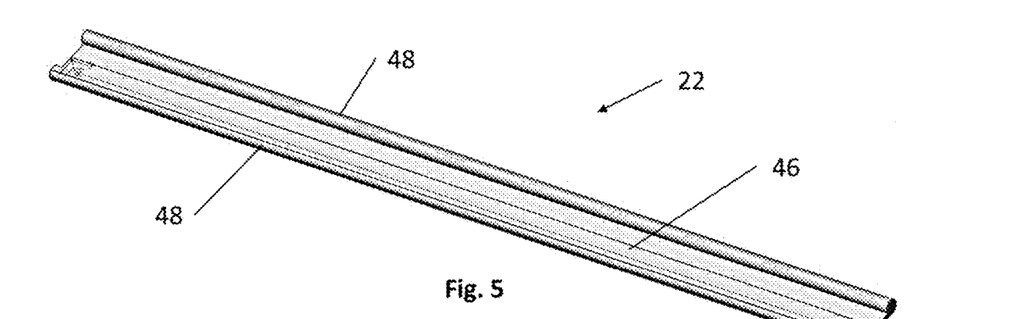
FIG. 5 shows a perspective view of the sealing strip according to the comparative example.

FIGS. 3 and 4 show further views of this control surface arrangement 14 with the sealing strip 22 according to the comparative example. FIG. 5 shows a perspective view of the sealing strip 22 according to the comparative example before it is mounted in the control surface arrangement 14. As visible from FIGS. 3 to 5, the sealing strip 22 according to the comparative example has a continuous cross-section with a profile including a mid-seal section 46 and welting sections 48. Hence, the sealing strip 22 of the comparative example has continuous weltings. Usually, one of the ends of the sealing strip 22 has a chamfered welting to ease its assembly (not depicted in FIG. 5). The welting sections 48 are arranged at end portions of the profile so that they are provided along the longitudinal edges of the sealing strip 22. The mid-seal section 46 is arranged between the welting sections 48. The welting sections 48 are used to fix the sealing strip 22 on the control surface elements 16. Especially, the seal brackets 42 enclose the welting sections 48 in a positive engagement. Since the outer side 44 of the sealing strip 22 is intended to lie closely against inner sides at the edges of the control surface elements 16, it is essentially flat as seen in the cross-section, and the welting sections 48 protrude on an inner side 50 of the sealing strip 22.

When the sealing strip 22 according to the comparative example is bent to align with the nose radius, the mid-seal section 46 may be deformed towards the neutral fiber 52 (in sense of bending) of the overall cross-section as shown in FIG. 3. This can happen because the mid-seal section 46 as manufactured is in the tension-area of the bent profile. Thus, this tension "pulls" the mid-seal section 46 on to a smaller bent radius. This reliefs the midseal-section-tension partially. The overall cross section's neutral fiber 52 is driven by both welting sections 48 which are required to retain the sealing strip 22 and, hence, cannot be overcome by different sizing. FIG. 4 compares the local neutral fiber 54 of the mid-seal section 46 and the local neutral fiber 56 of the welting sections 48 and shows a misalignment of these local neutral fibers 54, 56.

FIGS. 7, 9 to 12, and 15 show perspective views of a sealing strip 22 according to different embodiments of the invention. The sealing strip 22 has a first length region 102, a second length region 104 and a third length region 106.

In the embodiments shown, the first and third length regions 104, 106 are end regions and have a continuous cross-section with the profile as in the comparative example, including the welting sections 48 extending along the longitudinal edges of the first and third length regions 102, 106, and the mid-seal section 46 therebetween. The second length region 104 lies longitudinally between the first and third length regions 102, 106. In other words, the second length region 104 is located longitudinally of the sealing strip 22 between the first and third length regions 102, 106.

As indicated in FIG. 8, the second length region 104 is arranged, in use, in the nose region 100 where the slats 26 have the smallest bending radii.

The second length region 104 has the mid-seal section 46 functioning to seal the gap 20 as in the first and third length region 102, 106 and as in the comparative example. However, as visible from FIGS. 7, 9 to 12, and 15 the welting sections 48 are either omitted in the second length region 104—see FIG. 7—or the welting sections 48 in the second length region 104 are at least less rigid than the welting sections 48 in the first and third length regions 102, 106—see FIGS. 9, 10, 11, 12, 14, and 15.

Figure 9:
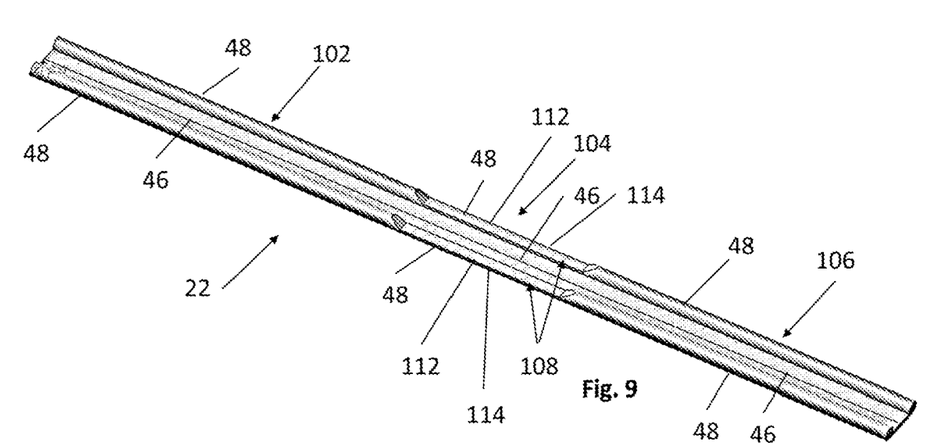
FIG. 9 shows a perspective view of a sealing strip according to a second embodiment of the invention.
Figure 14:
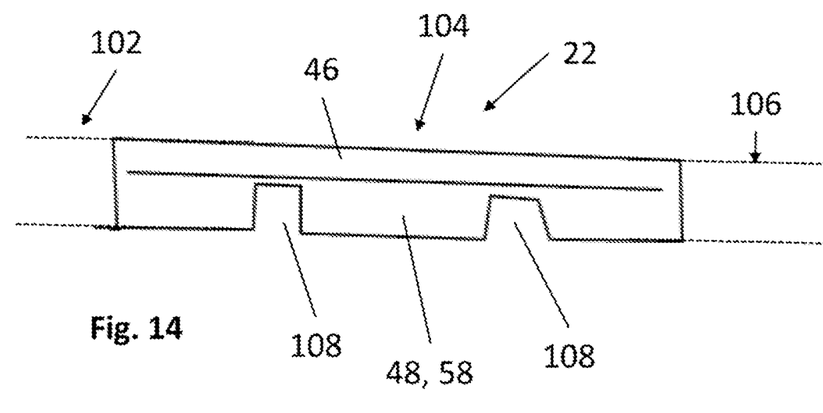
FIG. 14 shows a side view of a first variant of the sealing strip according to the sixth embodiment of the invention.
Figure 15:
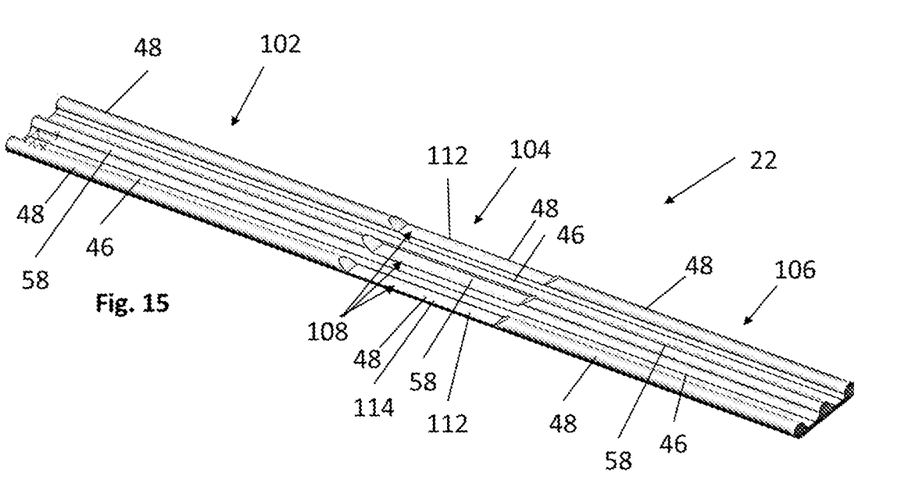
FIG. 15 shows a perspective view of a second variant of the sealing strip according to the sixth embodiment of the invention.

Especially, the welting sections 48 in the second length region have a thickness or diameter which is smaller than the thickness or diameter, respectively, of the welting sections 48 of the first and third length section 102, 106—see FIGS. 9 and 15—and/or have cut-outs 108 and/or castellations 110—see FIGS. 10, 11, 12, and 14.

Figure 6:
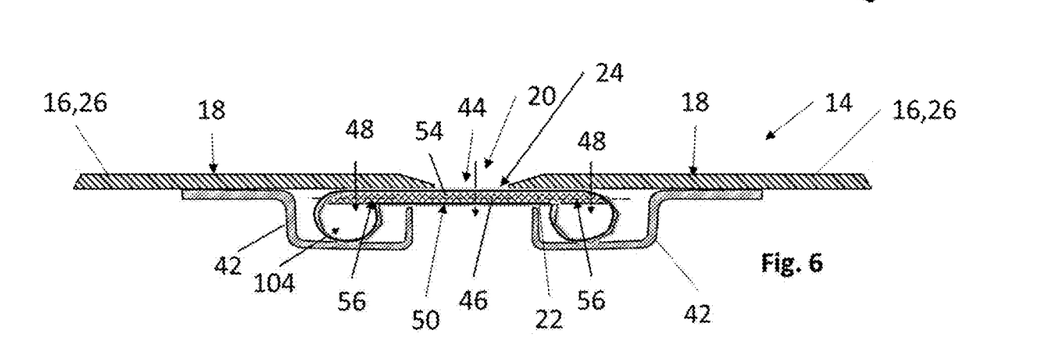
FIG. 6 shows a sectional view similar to FIG. 4 wherein a sealing strip according to a first embodiment of the invention is provided for sealing a gap of the control surface arrangement.

A comparison of FIGS. 3, 4, and 6 shows the effect of having reduced welting sections 48 in this length region 104 which is arranged in the nose area 100 or any other region of the control surface arrangement 14 with strong curvature.

FIG. 6 shows the control surface arrangement 14 wherein a sealing strip 22 according to a first embodiment of the present invention is installed as weather seal 24. The control surface arrangement 14 is the same as described above. The sealing strip 22 according to embodiments of the invention has the same elements as the sealing strip 22 of the comparative example with the difference that a welting is locally omitted or reduced in a length region 104 of the sealing strip which is intended to be arranged in an area 100 with high curvature.

Due to the low Young's modulus in seal materials the local neutral fibers 54, 56 of parts of the cross-section need to be considered. The root-cause for detrimental bending effects in FIG. 3 is the misalignment of local neutral fiber 54, 56 of the mid-seal section 46 and the welting sections 48.

Referring to FIG. 6, the welting is omitted, cut-out, or reduced in any other way in areas 100 of high curvature, such that the neutral fibers 54, 56 of the welting sections 48 and the mid-seal section 46 shall be aligned as good as possible. As shown in FIG. 8, the longitudinal location of the welting cut-out—indicated here by the location of the second length region 104—matches with the smallest nose-radius of the slats 26 after its assembly.

Hence, according to preferred embodiments, the second length region 104 which is a length region with omitted, reduced and/or cut-out welting sections 48 is arranged in the small slat-skin-radius area such as the nose area 100. FIG. 8 indicates with the reference sign 104 the area of small radius where the welting cut-out sits after the assembly of the sealing strip 22.

Referring again FIG. 6, the mid-seal section 46 lies tightly against the skins of the control surface elements 16. Thus, aerodynamics is improved by reduction of parasitic drag and attachment line discontinuities.

FIGS. 6 to 21 show different embodiments of the sealing strip 22 according to the invention. In all of these embodiments, the tendency of the mid-part to deform to smaller radii shall be encountered by alignment of the local neutral fiber locations. In all of these embodiments, the first and third length regions 102, 106 have a continuous cross-section with a profile that has the welting sections 48 and the mid-seal section 48 therebetween. Further, at one end, the welting section 48 may be chamfered, although this is not shown in the Figures. However, in the second length region 104 which lies between the first and third length region when seen in the longitudinal direction of the sealing strip welting sections are reduced, slotted, cut-out or omitted.

Figure 7:
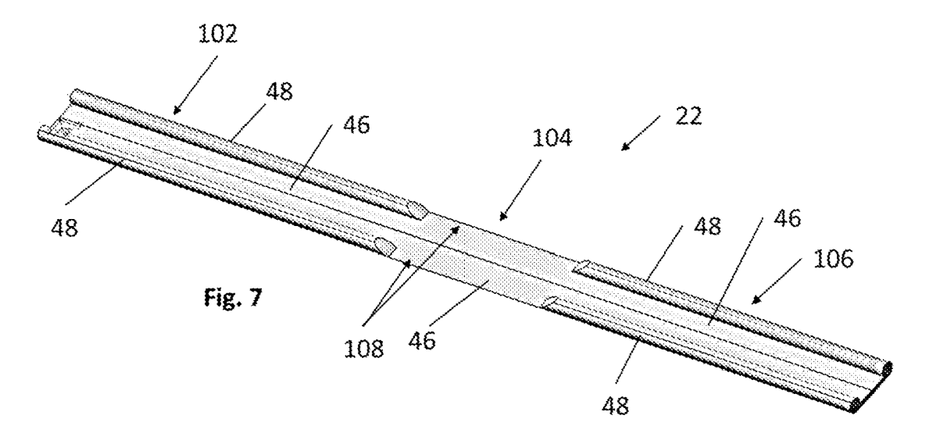
FIG. 7 shows a perspective view similar to FIG. 5 wherein the sealing strip according to the first embodiment having a length region with reduced welting sections of the invention is shown.

FIG. 7 shows the sealing strip 22 according to a first embodiment of the invention where no welting remains in the second length region 104 which is configured to be arranged in the nose area 100. The welting sections 48 of the first and third length regions are chamfered at the transitions to the second length region 104 to ease the assembly of the sealing strip 22 into the control surface arrangement 14.

FIG. 8 shows the sealing strip 22 according to a second embodiment of the invention with a reduced welting 112 in the second length region 104 which is configured to be arranged in the nose area 100. For example, a top part of the welting sections 48 is cut away in the second length region 104, and only a root part 114 of the welting sections 48 remains. Hence, the thickness and/or diameter of the welting section is reduced. Slanted ends of the welting sections 48 at the transition between the length regions 102, 104; 104, 106 help to introduce the sealing strip 22 during assembly.

FIG. 9 shows the sealing strip 22 according to a third embodiment of the invention with a castellation 110 of welting in the second length region 104 which is configured to be arranged in the nose area 100. The castellation 110 has a series of cut-outs 108. Preferably, ends of the cut-outs 108 are inclined.

Figure 10:
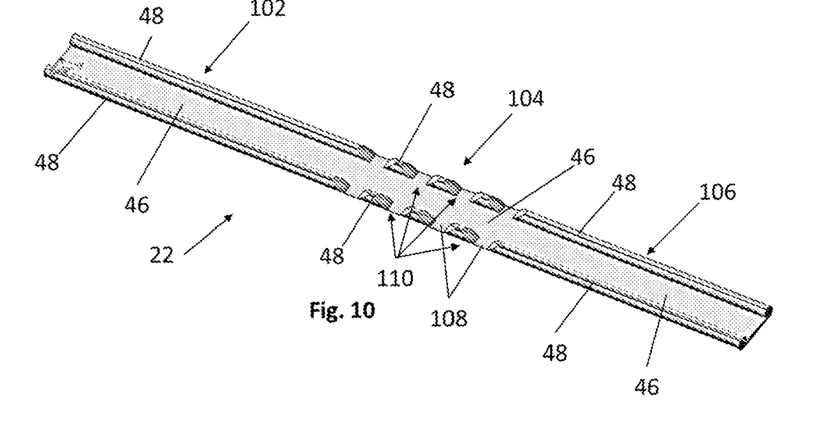
FIG. 10 shows a perspective view of a sealing strip according to a third embodiment of the invention.

FIG. 10 shows the sealing strip 22 according to a fourth embodiment of the invention with a castellated reduced welting 112 in the second length region 104 which is configured to be arranged in the nose area 100.

Figure 11:
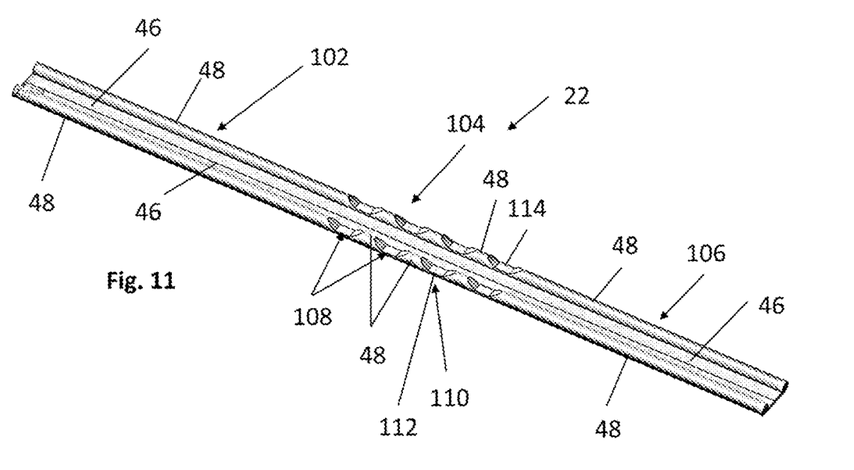
FIG. 11 shows a perspective view of a sealing strip according to a fourth embodiment of the invention.
Figure 12:
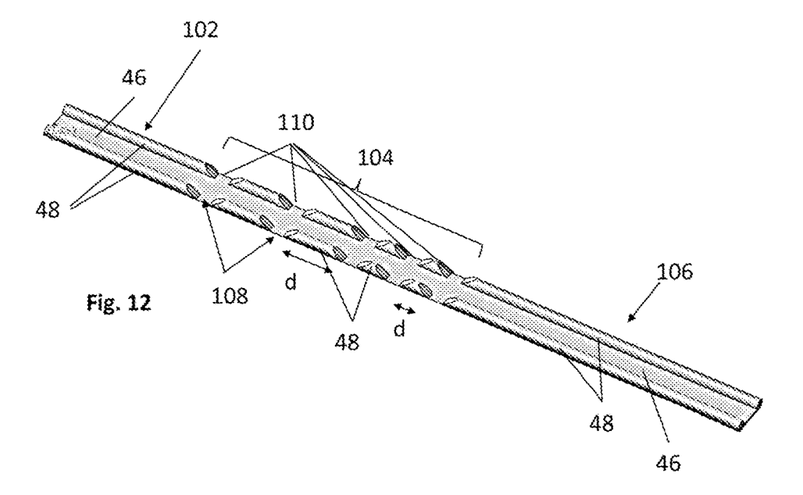
FIG. 12 shows a perspective view of a sealing strip according to a fifth embodiment of the invention.

FIG. 11 shows the sealing strip 22 according to a fifth embodiment of the invention. The second length region 104 configured to be arranged in the nose area 100 has local cut-outs 108 with remaining castellations. The cut-outs/castellations 108/110 have a distance d as a function of the local radius of the control surface arrangement 14. Especially, the distance of cut-outs 108 or the remaining thickness/diameter of the reduced weltings 112 in the second length region 104 is a function of the local slat-skin radius. In the embodiment shown, cut-outs 108 are also present on the top-skin radius (and not only in the nose area 100).

The sealing strip 22 of the embodiments of the invention as shown in FIGS. 13 to 21 additional has a stringer-type stiffener structure 58. A function of the stiffener structure 58 is now explained referring to FIG. 13.

Figure 13:
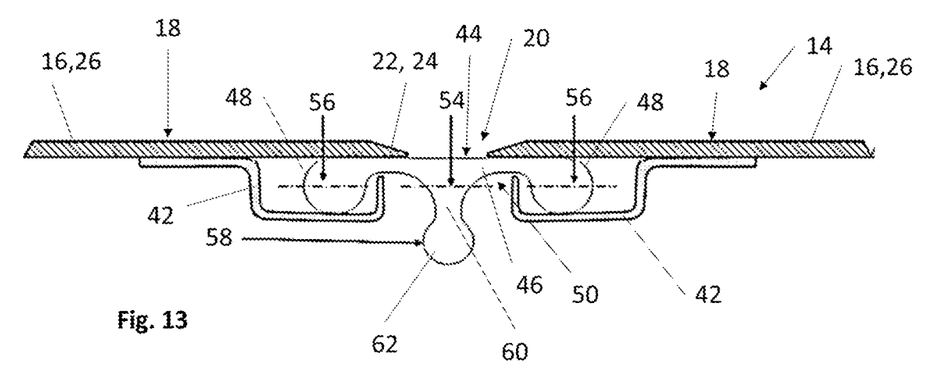
FIG. 13 shows a sectional view similar to FIG. 4 wherein a sealing strip according to a sixth embodiment of the invention is provided for sealing a gap of the control surface arrangement.

FIG. 13 shows the control surface arrangement 14 wherein a sealing strip 22 according to a sixth embodiment of the present invention is installed as weather seal 24. The control surface arrangement 14 is the same as described above. The sealing strip 22 according to the embodiments of the invention as shown in FIGS. 13 to 21 has the same elements as the sealing strip 22 of the comparative example with the differences that at least one stringer-type stiffener structure 58 is provided on the inner side 50 of the mid-seal section 46 and that a welting in the second length region 104 is reduced, especially omitted or slotted.

The stringer-type stiffener structure 58 is configured to align the local neutral fiber 54 of the mid-seal section 46 and the local neutral fiber 56 of the welting sections 48 as good as possible, as visible from a comparison of FIGS. 4 and 13. In order to fulfil this task, the stringer-type stiffener structure 58 may have different forms.

Due to the low Young's modulus in seal-materials the local neutral fibers 54, 56 of the cross section are considered in order to improve the bending behavior of the sealing strip 22 and in order to fit the bent sealing strip 22 better to the curvature of the gap 20. It has been found that the root-cause for detrimental bending effects is a misalignment of local neutral fibers 54, 56 between the mid-seal section 46 and the welting sections 48. By a mid-seal stringer, the local neutral fiber 54 of the mid-seal section 46 is shifted more inward. Preferably, it will be aligned with the local neutral fiber 56 of the welting section 48. By alignment of local neutral fiber locations, the tendency of the mid-seal portion 46 to deform to smaller radii shall be encountered.

As indicated in FIG. 14 showing a sealing strip 22 of a first variant of the sixth embodiment, the welting and a stringer-equipped seal might have cut-outs 108 in the small radii area.

FIG. 15 shows a sealing strip 22 of a second variant of the sixth embodiment which is a stringer equipped seal with local cut-outs 108.

Figure 16:
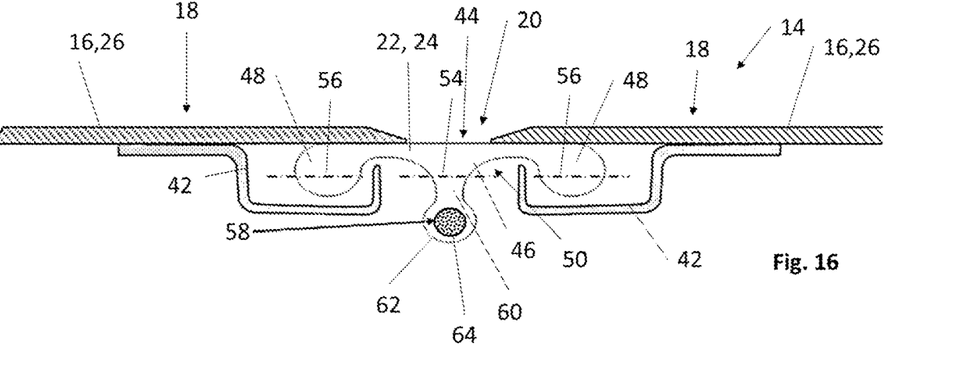
FIG. 16 shows a sectional view as in FIGS. 4 and 13 wherein a sealing strip according to a seventh embodiment of the invention is provided for sealing the gap of the control surface arrangement.
Figure 17:
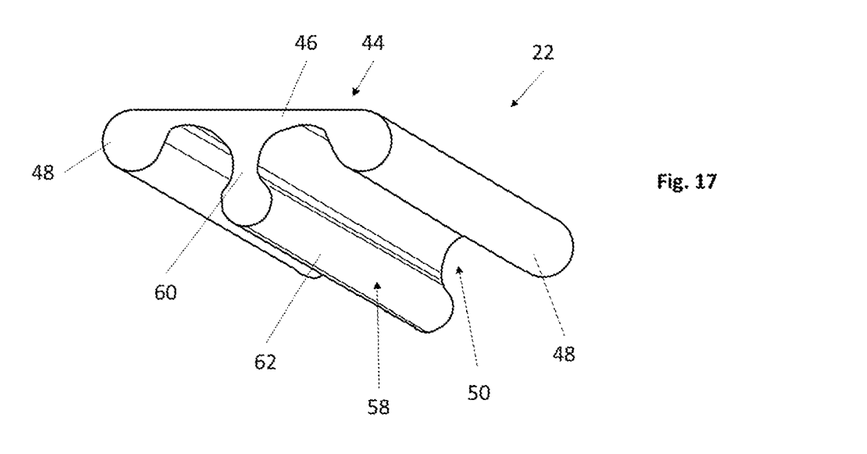
FIG. 17 shows a perspective view of a first length region of the sealing strip according to the sixth and seventh embodiment before its installation on the control surface arrangement.
Figure 18:
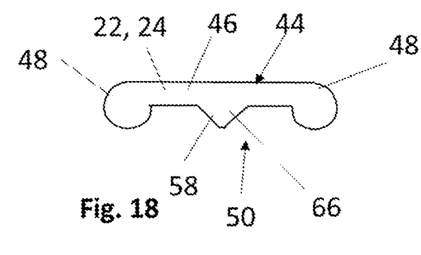
FIG. 18 shows a sectional view through a first length region of sealing strips according to an eighth embodiment of the invention.

Referring to FIGS. 13, 16, 17 showing sealing strips 22 according to a sixth and seventh embodiment of the invention, the stiffener structure 58 has a thinner neck portion 60 and a thicker head portion 62.

According to the seventh embodiment as shown in FIG. 16, the stiffener structure 58 may contain longitudinal reinforcements such as reinforcing fibers 64. Reinforcement fibers 64 (with a higher Young's Modulus than the seal matrix) in the stringer's head portion 62 may help to reduce the stringer size and probably its weight.

As shown in FIG. 17, the stringer solution can be produced as an end-less constant cross-section seal und thus safe costs. The sealing strip 22 may be made from any materials typical for conventional weather seals, such as rubber.

For providing the sealing strip 22 according to the embodiments of the invention, the sealing strip 22 may be cut from an end-less constant cross-section seal, and the welting sections 48 are cut or slotted or reduced, e.g., by machining, in the second length region 104. Further, if present, the stiffener structure 58 may also be cut or reduced as this is shown in FIG. 14.

Cross-sections through a profile of the first or third length region 102, 106 of further embodiments of the sealing strip 22 are shown in FIGS. 18 to 21. As visible therefrom, the stiffener structure 58 may also comprise a flange 66 or may even consist of solely the flange 66. Different cross-sections such as a rectangular section, a triangular section or a trapezoid section are possible. Especially for sealing strips 22 having a larger width, several stiffener structures 58 may be provided extending in parallel on the inner side of the mid-seal section 46. A further parameter for adjusting the bending behavior of the sealing strip 22 is the height with which the stiffening structure 58 protrudes from the inner side of the mid-seal section 46. Further parameters are the number, the distances and the dimensions of the cut-outs 108, the castellations 110 or the other reductions of weltings or stiffener structures 58.

Preferably, all these parameters are chosen such that the local neutral fibers 54, 56 are aligned as good as possible.

Figure 19:
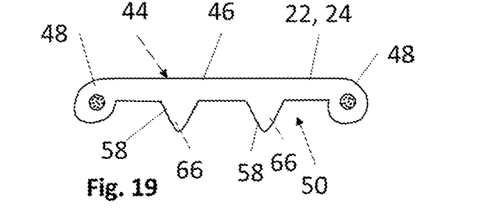
FIG. 19 shows a sectional view through a first length region of sealing strips according to a ninth embodiment of the invention.
Figure 20:
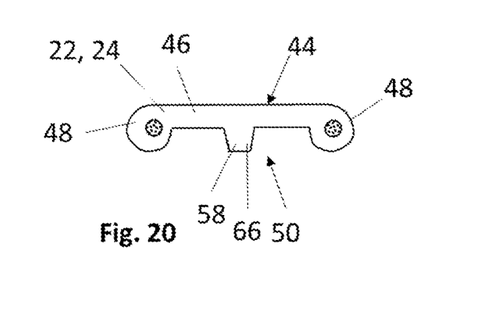
FIG. 20 shows a sectional view through a first length region of sealing strips according to a tenth embodiment of the invention; and, FIG. 21 shows a sectional view through a first length region of sealing strips according to an eleventh embodiment of the invention.
Figure 21:
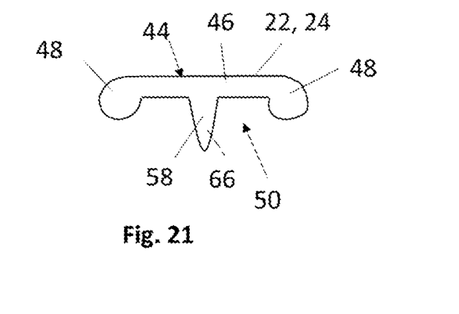

According to the embodiments shown in FIGS. 13 to 18, 20 and 21, one stiffening structure 58 is provided in the centrum of the sealing strip 22. FIG. 19 shows an embodiment with several stiffening structures 58. The several stiffening structures 58 may be evenly distributed over the width of the mid-seal section 46. Preferably, the distances between the stiffening structures 58 and the welting sections 48 are equal.

The features of the different embodiments of the sealing strip 22 can be combined as wished.

With preferred embodiments of the invention, the sealing strip 22 will lie in its intended location to close the gap 20 as smooth as possible and/or to avoid a step between the control surface element edge and the outer side 44 of the sealing strip 22 as far as possible. This improves aerodynamics by reduction of parasitic drag and attachment line discontinuities.

In order to improve a sealing of a gap (20) between control surfaces of an aircraft for enhancing aerodynamics, the solution as described above provides a sealing strip (22) for sealing a gap (20) between convexly curved aerodynamic surface elements (16) of an aircraft (10) such that the sealing strip (22) has a convexly curved outer side (44), the sealing strip (22) having welting sections (48) at longitudinal edges of the sealing strip (22) for fixing the sealing strip (22) at the aerodynamic surface elements (16) and a mid-seal section between the welting sections (48), wherein the welting sections (48) protrude on an inner side from the mid-seal section (46), wherein the sealing strip (22) has a first length region (102), a second length region (104) and a third length region (106), the second length region (104) being located longitudinally of the sealing strip (22) between the first and third length regions (102, 106), wherein the welting sections (48) are omitted in the second length region (104) or the welting sections (48) in the second length region are less rigid than the welting sections (48) in the first and third length regions. Further, a control surface arrangement (14), a wing (12) and an aircraft (10) comprising such a sealing strip (22) as weather seal (24) have been described.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE SIGN LIST 10 aircraft
12 wing
14 control surface arrangement
16 control surface element
18 outer surface
20 gap
22 sealing strip
24 weather seal
26 slat
28 aileron
30 flap
32 spoiler
34 trimmable horizontal stabilizer
36 elevator
38 rudder
40 wing structure
42 seal bracket
44 outer side
46 mid-seal section
48 welting section
50 inner side
52 neutral fiber (overall cross-section)
54 local neutral fiber of the mid-seal section
56 local neutral fiber of the welting section
58 stiffener structure
60 neck portion
62 head portion
64 reinforce fibers
66 flange
100 nose area
102 first length region
104 second length region
106 third length region
108 cut-out
110 castellation
112 reduced welting
114 root part
d distance of cut-out

The invention claimed is:

1. A control surface arrangement for an aircraft, comprising:
  a first and a second control surface element each having convexly curved outer surfaces and being arranged side by side in a spanwise direction with a gap therebetween, wherein the gap is covered by a sealing strip comprising:
  a convexly curved outer side,
  welting sections at both longitudinal edges of the sealing strip for fixing the sealing strip at the first and the second control surface elements, and
  a mid-seal section between the welting sections,
  wherein the welting sections protrude on an inner side from the mid-seal section,
  wherein the sealing strip has a first length region, a second length region, and a third length region, the second length region being located longitudinally of the sealing strip between the first and third length regions,
  wherein the welting sections are omitted in the second length region or the welting sections in the second length region are less rigid than the welting sections in the first and third length regions,
  wherein the second length region is arranged in an area of the control surface arrangement with a strongest curvature or a smallest curvature radius.

2. The control surface arrangement according to claim 1, wherein the sealing strip has, in the first and third length regions, a profile with the welting sections and the mid-seal section therebetween and with at least one stringer-type stiffening structure arranged on the inner side of the mid-seal section.

3. The control surface arrangement according to claim 2, wherein the stringer-type stiffening structure is omitted in the second length region or has a stiffness reduced compared to the stiffness of the stringer-type stiffening structure of the first and third length regions.

4. The control surface arrangement according to claim 2, wherein the stiffening structure comprises a flange protruding on the inner side of the mid-seal section, or a neck portion and a head portion, or is configured to align a local neutral fiber location of the mid-seal section of a bent sealing strip with a local neutral fiber location of the welting sections, or a combination thereof.

5. The control surface arrangement according to claim 1, wherein one of the welting sections is fixed to the first control surface element, the other welting section is fixed to the second control surface element and an outer side of the mid-seal section is convexly curved.

6. The control surface arrangement according to claim 1, wherein the welting sections of the second length region comprise a thickness or diameter which is smaller than the thickness or diameter, respectively, of the welting sections of the first and third length regions, or cut-outs, or castellations, or any combination thereof, wherein a number, distance or size of the cut-outs or the castellations is based on a local curvature radius.

7. The control surface arrangement according to claim 1, wherein the first and second control surface elements are configured to move between a fully extended position and a fully retracted position.

8. The control surface arrangement according to claim 1, wherein the first and second control surface elements are leading edge slats for an aircraft wing.

9. An aircraft comprising:
the control surface arrangement according to claim 1.

* * * * *